United States Patent
Dziuk et al.

(10) Patent No.: US 9,382,055 B2
(45) Date of Patent: Jul. 5, 2016

(54) APPARATUS AND METHOD FOR DISPLACING AIR FROM WINE CONTAINERS

(71) Applicants: Timothy W. Dziuk, Austin, TX (US); Roy Paul Prosise, Cedar Park, TX (US)

(72) Inventors: Timothy W. Dziuk, Austin, TX (US); Roy Paul Prosise, Cedar Park, TX (US)

(*) Notice: Subject to any disclaimer, the term of this patent is extended or adjusted under 35 U.S.C. 154(b) by 37 days.

(21) Appl. No.: 14/358,707

(22) PCT Filed: Nov. 15, 2012

(86) PCT No.: PCT/US2012/065266
§ 371 (c)(1),
(2) Date: May 15, 2014

(87) PCT Pub. No.: WO2013/074782
PCT Pub. Date: May 23, 2013

(65) Prior Publication Data
US 2014/0312059 A1 Oct. 23, 2014

Related U.S. Application Data

(60) Provisional application No. 61/559,725, filed on Nov. 15, 2011.

(51) Int. Cl.
| | | |
|---|---|---|
| *B67D 7/60* | (2010.01) |
| *B65D 81/26* | (2006.01) |
| *B67D 1/04* | (2006.01) |
| *C12H 1/16* | (2006.01) |
| *B65D 21/08* | (2006.01) |

(52) U.S. Cl.
CPC ............ *B65D 81/263* (2013.01); *B65D 21/08* (2013.01); *B67D 1/045* (2013.01); *C12H 1/16* (2013.01)

(58) Field of Classification Search
CPC .... B67D 1/0412; B67D 1/0437; B67D 1/045; B65D 81/236; B65D 21/08; C12H 1/16
USPC ........ 222/386.5, 152, 400.7, 394–399, 400.5, 222/401, 402.1, 387
See application file for complete search history.

(56) References Cited

U.S. PATENT DOCUMENTS

| | | | | |
|---|---|---|---|---|
| 3,272,404 A * | 9/1966 | Graves et al. | ................. | 222/396 |
| 3,300,102 A * | 1/1967 | Budzich | .................... | 222/386.5 |
| 4,702,396 A * | 10/1987 | Gwiazda | ....................... | 222/152 |
| 4,809,884 A * | 3/1989 | Stackhouse | ............. | 222/153.04 |
| 5,180,081 A * | 1/1993 | McCann | .......................... | 222/23 |
| 5,251,787 A * | 10/1993 | Simson | ........................ | 222/95 |
| 5,499,758 A * | 3/1996 | McCann et al. | ........... | 222/386.5 |
| 5,566,730 A * | 10/1996 | Liebmann, Jr. | ................. | 141/64 |
| 7,051,901 B2 * | 5/2006 | Hickert | ............................ | 222/1 |
| 7,395,949 B2 * | 7/2008 | Ehret et al. | ................. | 222/386.5 |
| 8,141,746 B2 * | 3/2012 | Lambrecht | ..................... | 222/152 |
| 2009/0095776 A1 * | 4/2009 | Turner et al. | ................ | 222/386.5 |

* cited by examiner

*Primary Examiner* — Lien Ngo
(74) *Attorney, Agent, or Firm* — Rick B Yeager

(57) ABSTRACT

An air removal and wine dispenser device for a wine bottle has a bottle seal and a balloon. The balloon is inflated with a pump to displace air from the bottle. Additional inflation forces wine through a dispensing tube. Wine flow is controlled by a wine valve. In one embodiment, a single control valve is used to vent air and dispense wine, and a cam lever is used to expand a cam seal and to operate a balloon deflation valve.

15 Claims, 25 Drawing Sheets

APPARATUS AND METHOD FOR DISPLACING AIR FROM WINE CONTAINERS

RELATED APPLICATIONS

This application is related to U.S. Provisional Patent Application No. 61/559,725 filed Nov. 15, 2011 by applicant, and claims priority of that filing date.

BACKGROUND

1. Field of Invention

The current invention relates to a device and method for preserving wine by displacing air from a wine bottle or storage container.

There is a need for improved devices and methods which provide a simple mechanical displacement of air from a wine bottle or wine container.

2. Prior Art

Prior art wine preservation techniques include vacuum devices to remove air and inert gases to displace air.

SUMMARY OF INVENTION

In one embodiment, a cork for a wine bottle has two holes. A first tube containing an expandable bag is inserted into the first hole such that the bottom of the tube is near the bottom of the wine bottle. The first tube provides a path for pressurizing or depressurizing the bag. A second, shorter tube is inserted into the second hole. As the first tube is pressurized, the wine is displaced toward the cork, and air is forced out of the second tube. When the air is forced out of the bottle, the second tube is plugged for storage and unplugged for pouring wine out of the second tube. The bag may be further inflated as additional wine is consumed. The bag is deflated for removal from the bottle.

In a another embodiment, an inflatable bag is attached to the outside of the first tube. A detachable pump is provided to force air down the first tube into the inflatable bag, the tube seals when the pump is removed. A one way air valve is provided at the top of the second tube.

In a another embodiment, a non-pressurized system comprises a stopper with a first vent tube and a second pour tube and. The first vent tube includes one or more inflatable bags or balloons. As wine is poured from the pour tube, air enters the vent tube and inflates the bag(s) or balloon(s).

In a another embodiment, an inflation tube extends into a wine bottle from a chambered stopper. One portion of the tube provides a path to a pressurization balloon. As the balloon is pressurized, it forces wine into a second portion of the tube and outward to a serving conduit. In one example, the balloon is provided in a top portion of the wine bottle, and the wine is forced from near the bottom of the bottle into the serving conduit.

In another embodiment, a balloon is inflated with a pump though an inflation tube; and air and wine are vented through a single valve.

In a another embodiment, perforated wine dispensing tube extends into a wine bottle from a bottle seal. As a ballon is inflated, air is forced through the perforations. After the air is dispelled, wine is dispensed through the wine dispensing tube.

In another embodiment, a wine decanter is provided with a floating lid which has a close tolerance with respect to the side walls of the decanter. The lid has a vent hole with removable stopper. In use, the floating lid is allowed to drop slowly onto the wine so that air is displaced trough the vent hole. After the air is evacuated, the hole is plugged with the stopper.

DESCRIPTION OF EMBODIMENT

Single Wine and Air Valve

Figure 7:
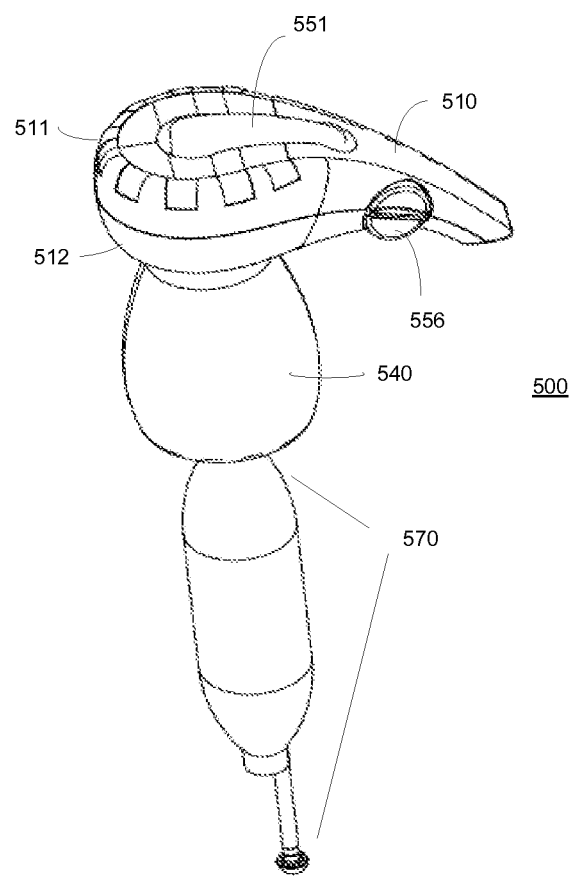
FIG. 7 is a side perspective view of an embodiment of an air removal and wine dispenser device.

FIG. 7 is a side perspective view of an embodiment of an air removal and wine dispenser device 500 comprising a top assembly 510 with a housing top portion cap 511 and housing bottom portion 512; a pump assembly 540; and a balloon assembly 570.

Figure 16:
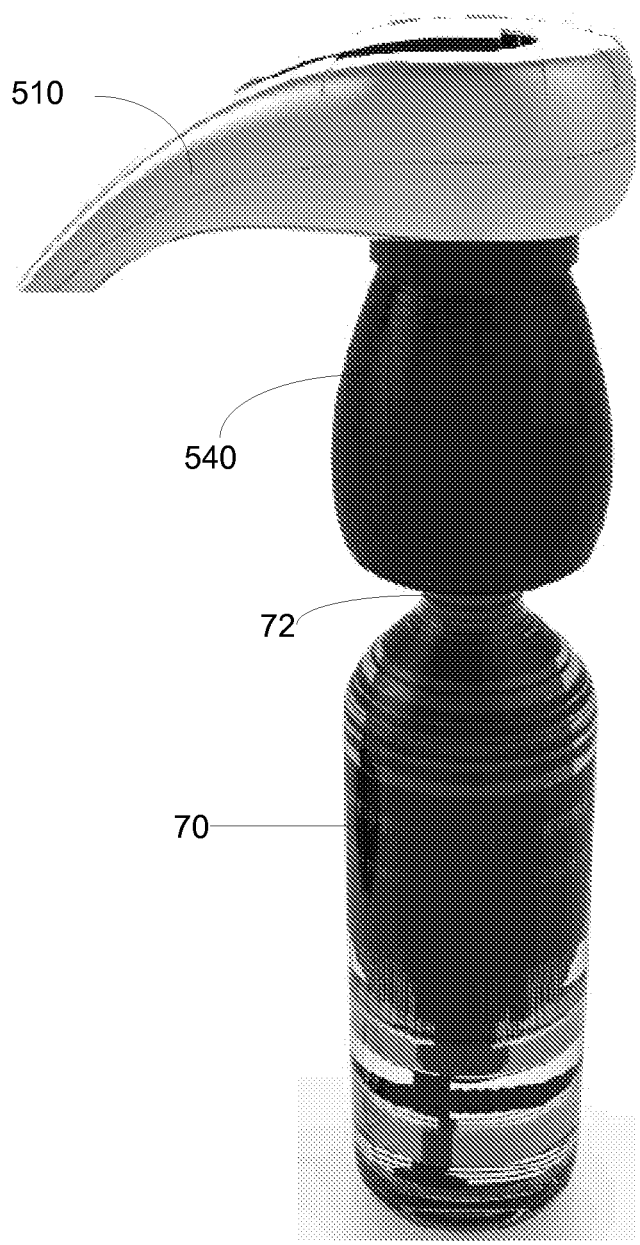
FIG. 16 is a side perspective view of the embodiment of FIG. 7 with the pump assembly inserted over the neck of a wine bottle, and the balloon assembly inserted into the wine bottle.

FIG. 16 is a side perspective view of the air removal and wine dispenser device 500 embodiment of FIG. 7 with the pump assembly 540 inserted over the neck 72 of a wine bottle 70, and the balloon assembly 570 inserted into the wine bottle. In this embodiment, the balloon assembly 570 is inserted into the wine bottle with the cam lever 551 in a raised position. As described more fully below, when the balloon is inserted in a wine bottle and inflated, the inflated balloon displaces air out of the wine bottle; and continued inflation forces wine out of the bottle into a dispensing tube.

Balloon Assembly

Figure 8:
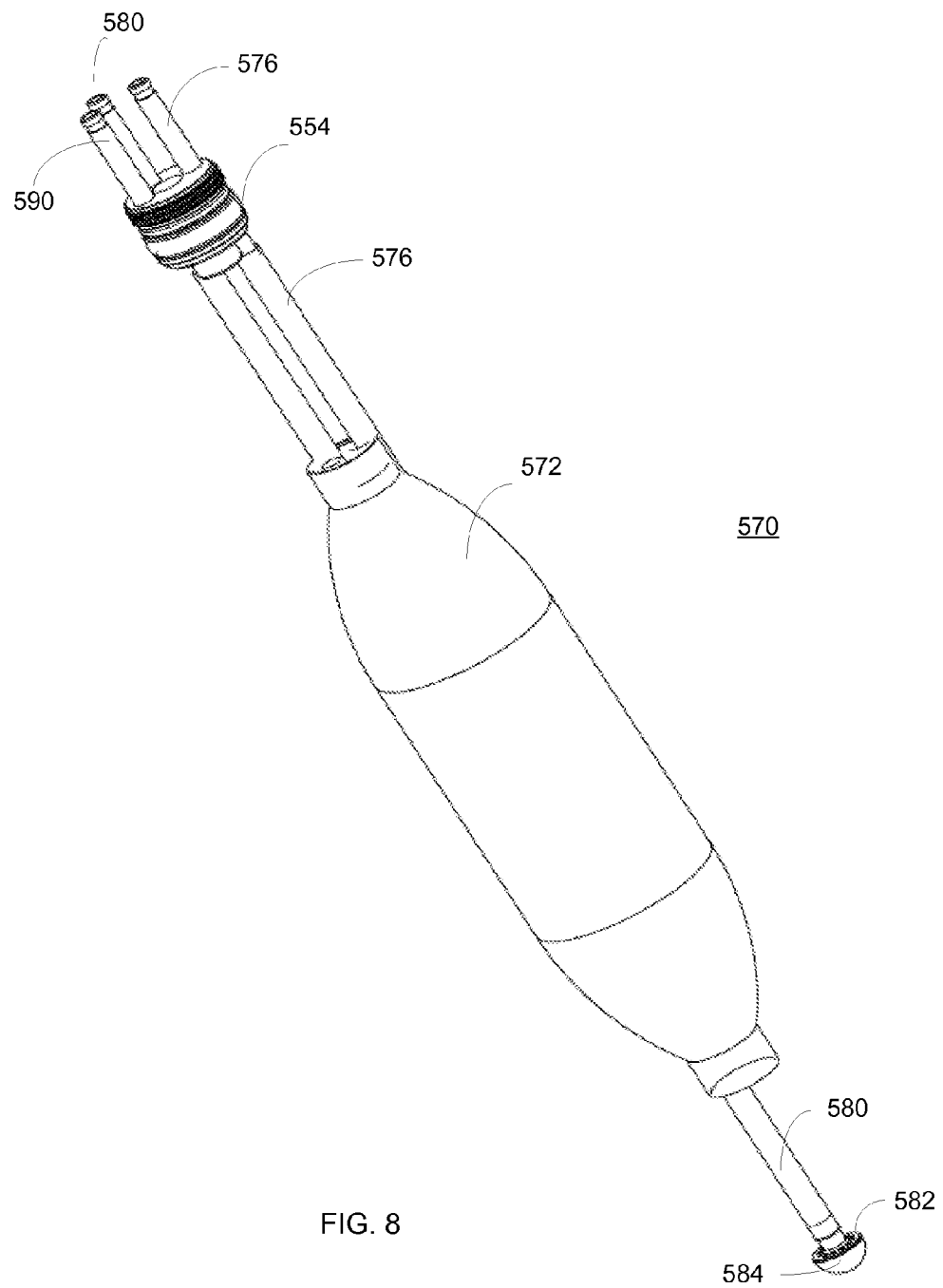
FIG. 8 is a side perspective view of a balloon assembly of the embodiment of FIG. 7.

FIG. 8 is a side perspective view of a balloon assembly 570 of the embodiment of FIG. 7. A cam seal 554 seals against the inside of a bottle neck and secures the bottle from slipping way from the device. After the balloon assembly 570 is inserted into a wine bottle, the cam seal 554 is forced against the inside neck of the bottle to create a seal and to prevent the bottle from falling off of the device when the device is gripped by the pump assembly.

In this embodiment, the balloon assembly 570 comprises a balloon inflation tube 576 which penetrates the cam seal and inflates a balloon 572. The balloon assembly also includes a wine dispense tube 580 which penetrates the bottle seal assembly. In this embodiment, the wine dispense tube includes inlet holes 582 and an elevation element 584. The elevation element may rest on the bottom of the bottle so that the elevation element prevents sediment at the bottom of a wine bottle from being drawn into the wine dispense tube 580. In this example, the elevation element has a curved bottom which is configured to be positioned in the concave sides of the bottom of a wine bottle.

In this example, the balloon 572 is positioned along a middle portion of the balloon inflation tube 576. A vent tube 590 also penetrates the cam seal. As the ballon is inflated, air is forced out of the vent tube. As the balloon is further inflated, and the air is dispelled, wine above the balloon may also be forced through the vent tube.

In this specification, the term "tube" refers to any conduit or channel which permits air or wine to flow from one point to another.

Figures 9, 10:
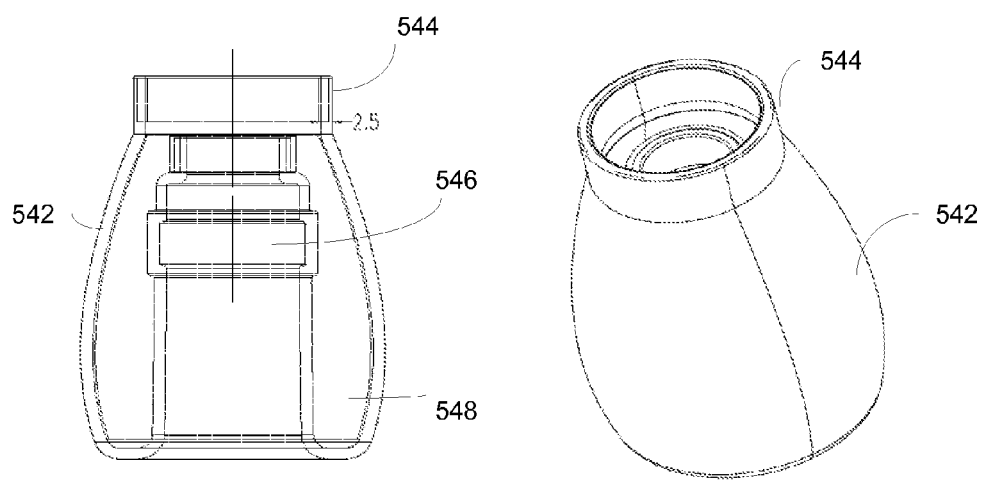
FIG. 9 is a side perspective view of the pump of the pump assembly of the embodiment of FIG. 7.
FIG. 10 is a side cross section view of the pump of FIG. 9.

FIG. 9 is a side perspective view of the pump 542 of the pump assembly 540 of the embodiment of FIG. 7. FIG. 10 is a side cross section view of the pump of FIG. 9. The pump is configured to be grasped in the hand of a user and squeezed in order to drive air from the pump chamber 548 through a one-way valve in the top assembly and into the balloon inflation tube into the balloon in order to inflate the balloon. The bottle neck recess 546 is positioned over the top of the neck of the wine bottle. When the cam seal is engaged against the inside of the bottle, the device is held firmly with respect to the bottle.

A retaining ring is positioned over the retaining ring mount area 544 to seal the pump against the top assembly of the device.

Air and Wine Movement

Figure 11:
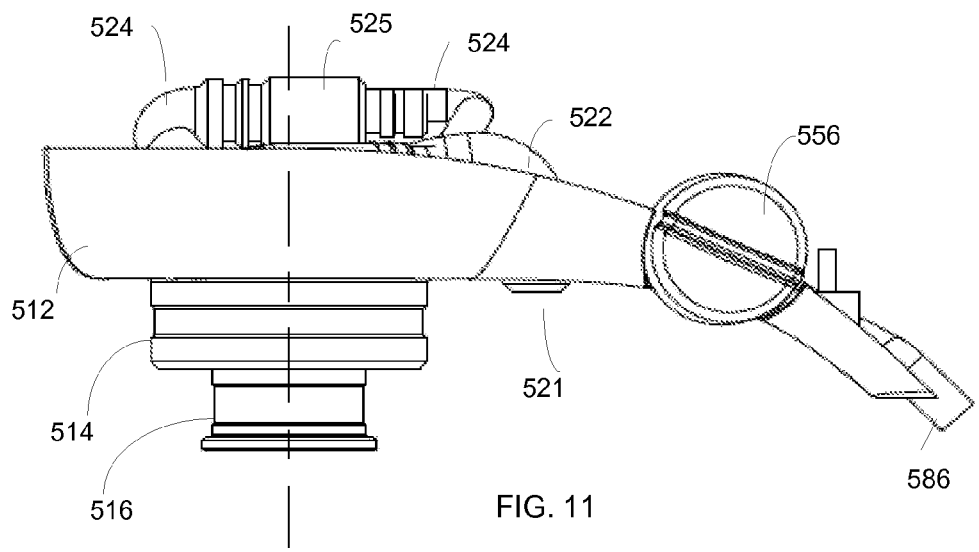
FIG. 11 is a side view of the bottom portion of the top assembly of the embodiment of FIG. 7.
Figure 12:
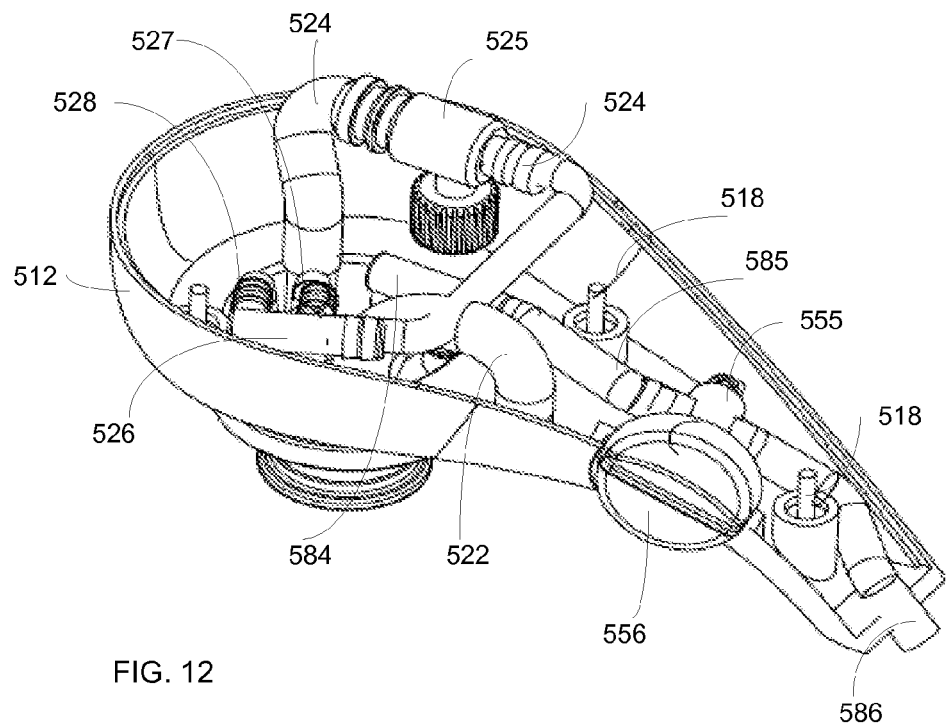
FIG. 12 is a top perspective view of the of the bottom portion of the top assembly of FIG. 11.
Figure 17:
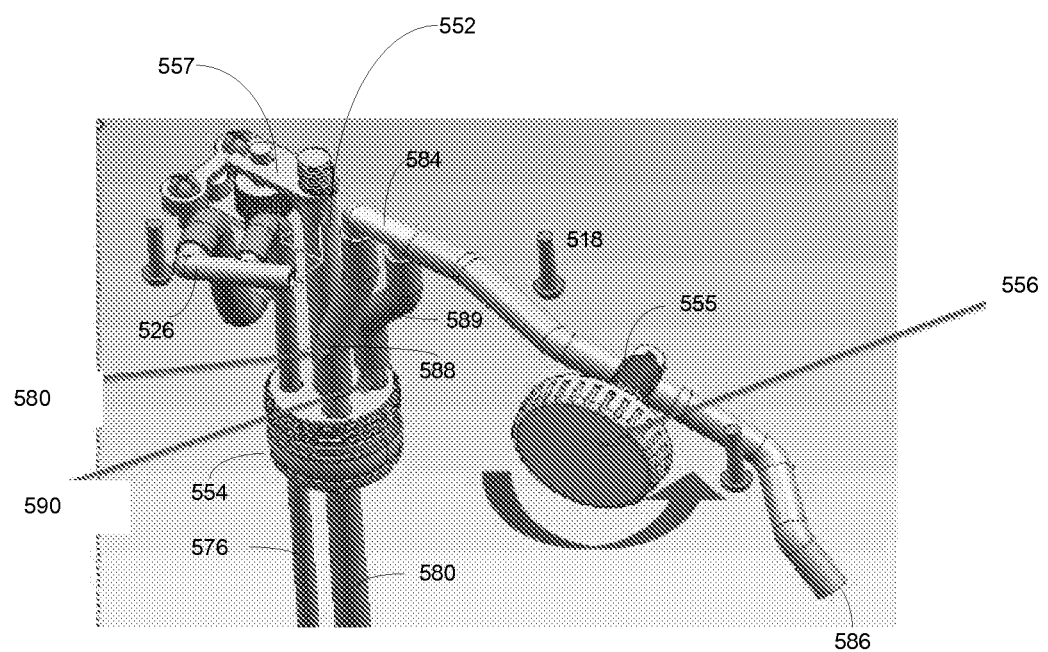
FIG. 17 is a perspective view of components that permit air and wine movement from the wine bottle for the embodiment of FIG. 7.
Figure 18:
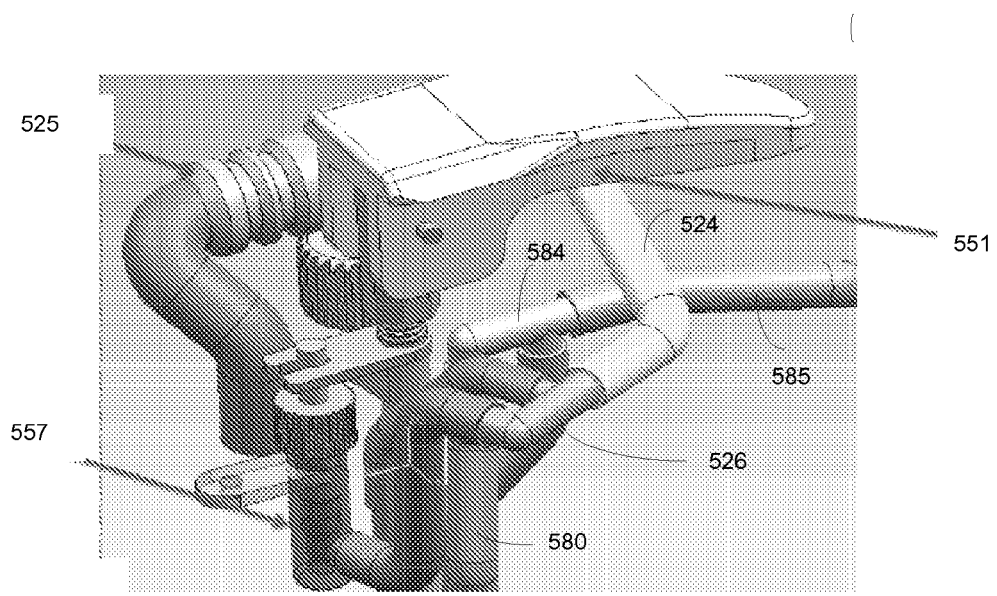
FIG. 18 is a perspective view of the cam and hose assembly for the embodiment of FIG. 7.
Figure 19:
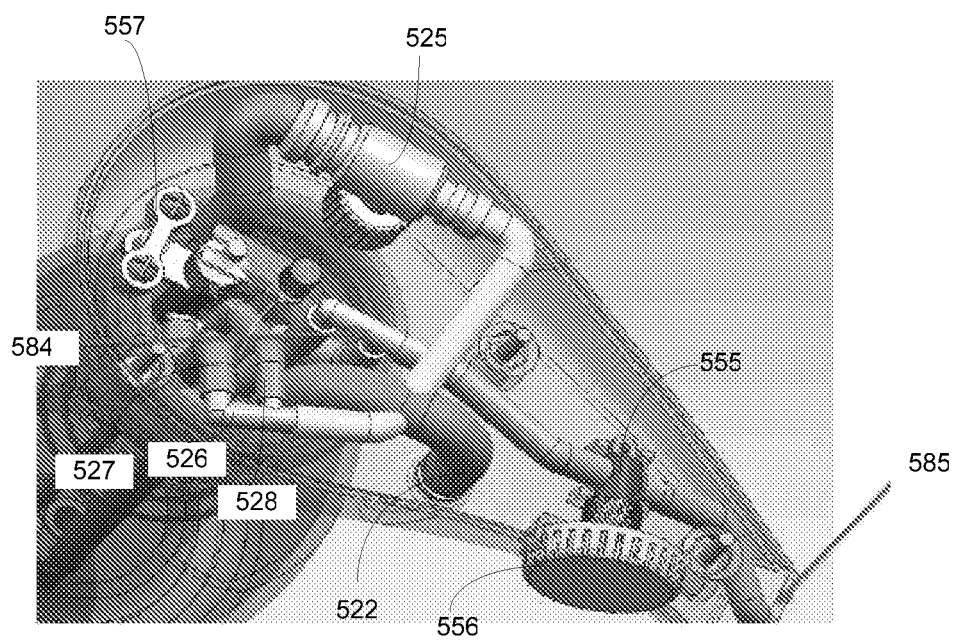
FIG. 19 is a perspective view of air and wine movement components in the bottom housing portion of the top assembly for the embodiment of FIG. 7.

FIG. 11 is a side view of the bottom portion of the top assembly of the embodiment of FIG. 7. FIG. 12 is a top perspective view of the of the bottom portion of the top assembly of FIG. 11. FIG. 17 is a perspective view of components that permit air and wine movement from the wine bottle for the embodiment of FIG. 7. FIG. 18 is a perspective view of the cam and hose assembly for the embodiment of FIG. 7. FIG. 19 is a perspective view of air and wine movement components in the bottom housing portion of the top assembly for the embodiment of FIG. 7.

Air is provided to the pump through air intake 521 and air intake tubing 522. The pump drives air through pumped air tubing 524, through one way valve 525, and then to air manifold 526 to the balloon inflate tube connector 527 and deflation connector 528. The deflation connector is connected to a deflation air valve 557 so that when the deflation air valve is closed, air is directed to inflate the balloon through the balloon inflate tube connector 527 to the balloon inflation tube 576. In this example, the deflation air valve is closed when the cam lever is in a down position, and opened when the cam lever is in a raised position. When the cam lever is raised, the deflation air valve 557 is opened so that the air in the balloon may be vented and deflated for removal from the wine bottle.

A wine and vented air valve 555 is opened by a valve handle 556 thereby permitting vented air or wine to flow through wine and vented air tubing 585 and out dispensing end portion 586.

Vent manifold 584 has a wine dispense tube connector 588 to the wine dispense tube and a vent tube connector 589 to the vent tube. In this example, when the wine and vented air valve 557 is turned to a first position and the balloon is inflated, air is forced out of the air vent and wine and vented air tubing 585. When the wine and vented air valve 557 is turned to a second position and the balloon is inflated, wine is forced through wine dispense tube and out the wine and vented air tubing 585.

Figure 13:
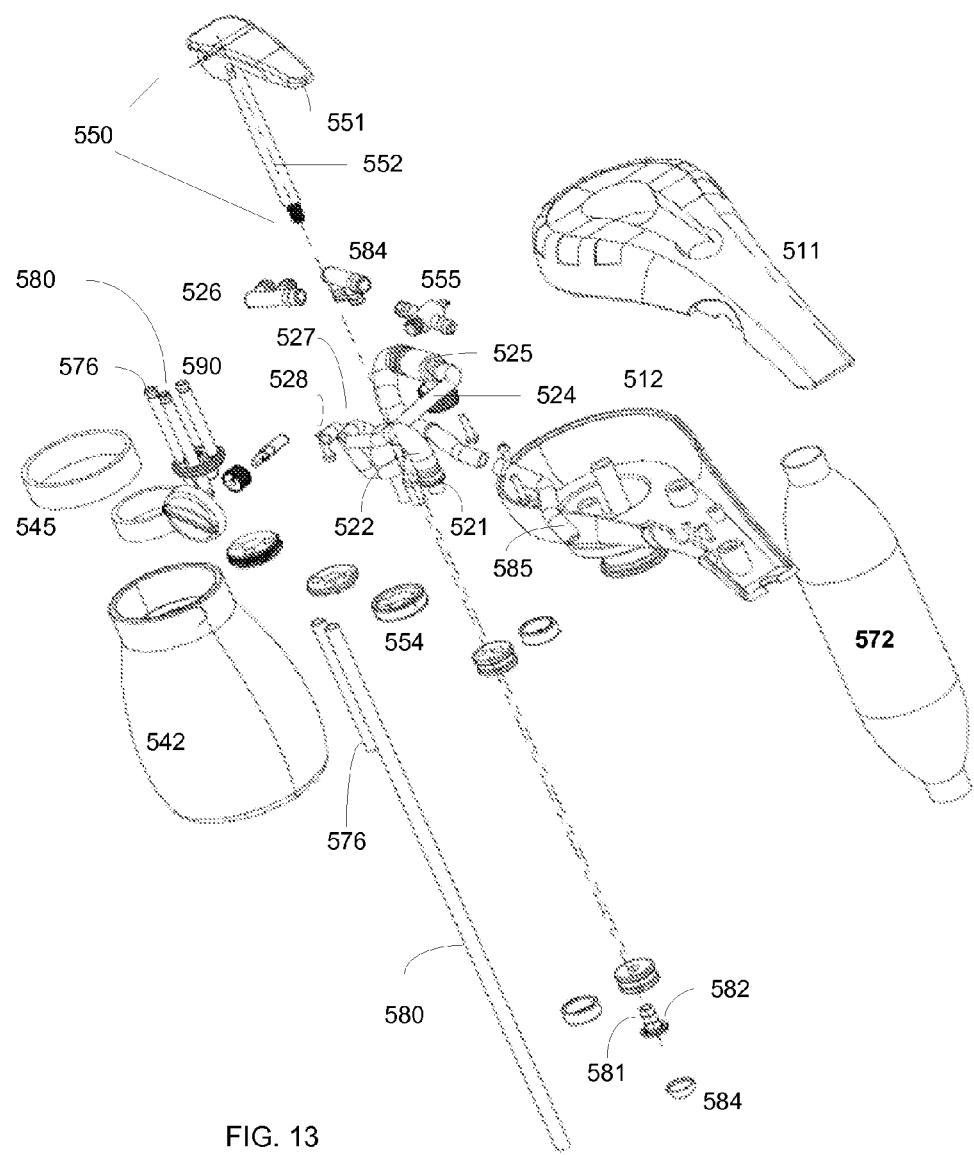
FIG. 13 is an exploded view of the embodiment of FIG. 7.

FIG. 13 is an exploded view of the embodiment of FIG. 7. In this example, an inlet fitting 581 with inlet holes 582 is provided on the distal wine entry end of the wine dispensing tube 576, and the elevation element 584 is installed over the fitting. Retaining ring 545 fits over the retaining ring mount 544 on the pump assembly. The proximal end of the wine dispensing tube is opposite the distal end, and the tube may have one or more connecting elements or intermediate housings between the proximal end and the distal end.

Cam Lever and Sealing

In this example, a single manual valve, the wine and vented air valve 557, is used to vent both air and wine from the wine bottle. The deflation air valve 557 is controlled by the cam lever, which also seals the cam seal 554 after insertion of the device in a bottle, and unseals the device for removal from the bottle.

Figure 14:
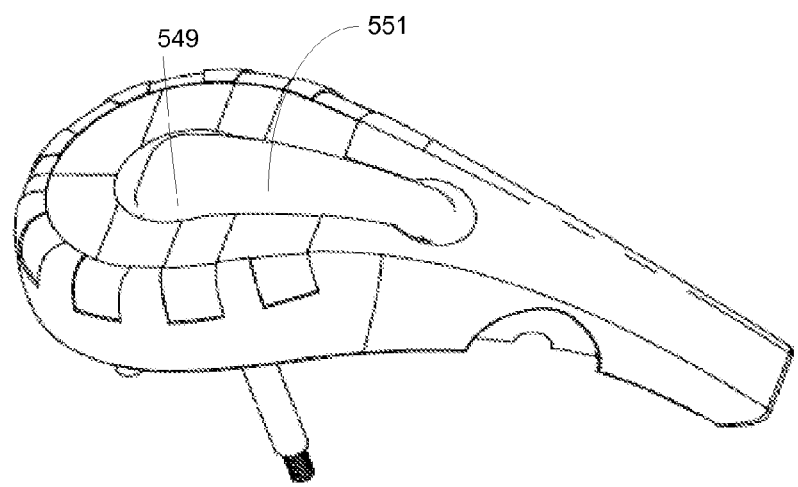
FIG. 14 is a top perspective view of the top portion cap of the embodiment of FIG. 7 with the cam lever in a closed position.

FIG. 14 is a top perspective view of the top portion cap 511 of the embodiment of FIG. 7 with the cam lever 551 in a closed position 549. In the closed position, the deflation air valve 557 is closed and the cam shaft forces the cam seal against the inside of the wine bottle neck.

Figure 15:
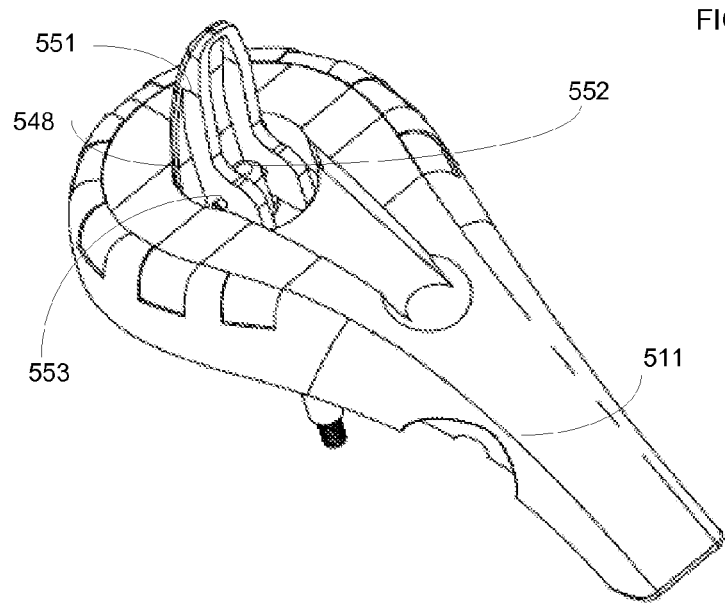
FIG. 15 is a top perspective view of the top portion cap of the embodiment of FIG. 7 with the cam lever in an open position.

FIG. 15 is a top perspective view of the top portion cap 511 with the cam lever in an a raised position 548. In the raised position, the deflation air valve 557 is opened to permit deflation of the balloon, and the cam shaft 552 is raised by the cam lever pin 553 to unseal the cam seal 554.

Device Operation

The following steps illustrate a typical device operation for the embodiment of FIGS. 7-19.

At step 1000, the cam lever 551 of the air removal and wine dispenser device 500 is raised so that the balloon assembly 570 may be inserted through the top of a wine bottle. Insertion of the device is typically performed after pouring one or more glasses of wine from the bottle.

At step 1100, the cam lever 551 is lowered to a closed position 549, which closes the deflation air valve 557 and forces the cam shaft 552 downward to expand the cam seal 554 against the inside of the bottle. The expanded cam seal prevents air flow into or out of the wine bottle, and secures the air removal and wine dispenser device relative to the bottle.

At step 1200, the wine valve 555 is opened to a first position by rotating the wine valve handle 556 while the pump 542 is operated by squeezing and releasing the pump. The pumping operation forces air into the balloon to inflate the ballon and to displace air and wine toward the top of the bottle. The balloon is typically inserted so that wine is present below the balloon, and both air and wine are present above the balloon. In one example, the wine valve may be rotated a quarter-turn to release air, and a half-turn to release wine from the bottle.

At step 1300, as the balloon is inflated by pumping the pump, the air and wine above the balloon is forced upward so that air is forced out of vent tube 590 through the wine valve 555 and out the dispensing end portion 586 of the wine and vented air tubing 585.

At step 1400, as the air is displaced, wine enters the vent tube 590. The wine valve 555 is rotated to a closed position as the first wine is expelled out the dispensing end portion 586. If desired, the valve may remain open while one or more glasses of wine is dispensed. Wine is typically forced from both above the balloon and from the bottom of the bottle through the wine dispense tube 580.

At step 1500, the wine bottle and is stored with the air removal and wine dispenser device.

At step 1600, the wine valve 555 is rotated to an open position to dispense one or more glasses of wine. The pump may be operated during this dispensing in order to provide more wine pressure and wine flow. The storage and dispensing operations may be repeated.

At step 1700, the wine valve 555 is rotated to an open position and the cam lever is raised. Raising the cam lever releases the cam seal and opens the deflation air valve 557 which permits the balloon to be deflated.

At step 1800, the air removal and wine dispenser device is removed from the bottle.

Inflation Bulb and Dual Valve Device with
Disposable Balloon

Figure 20:
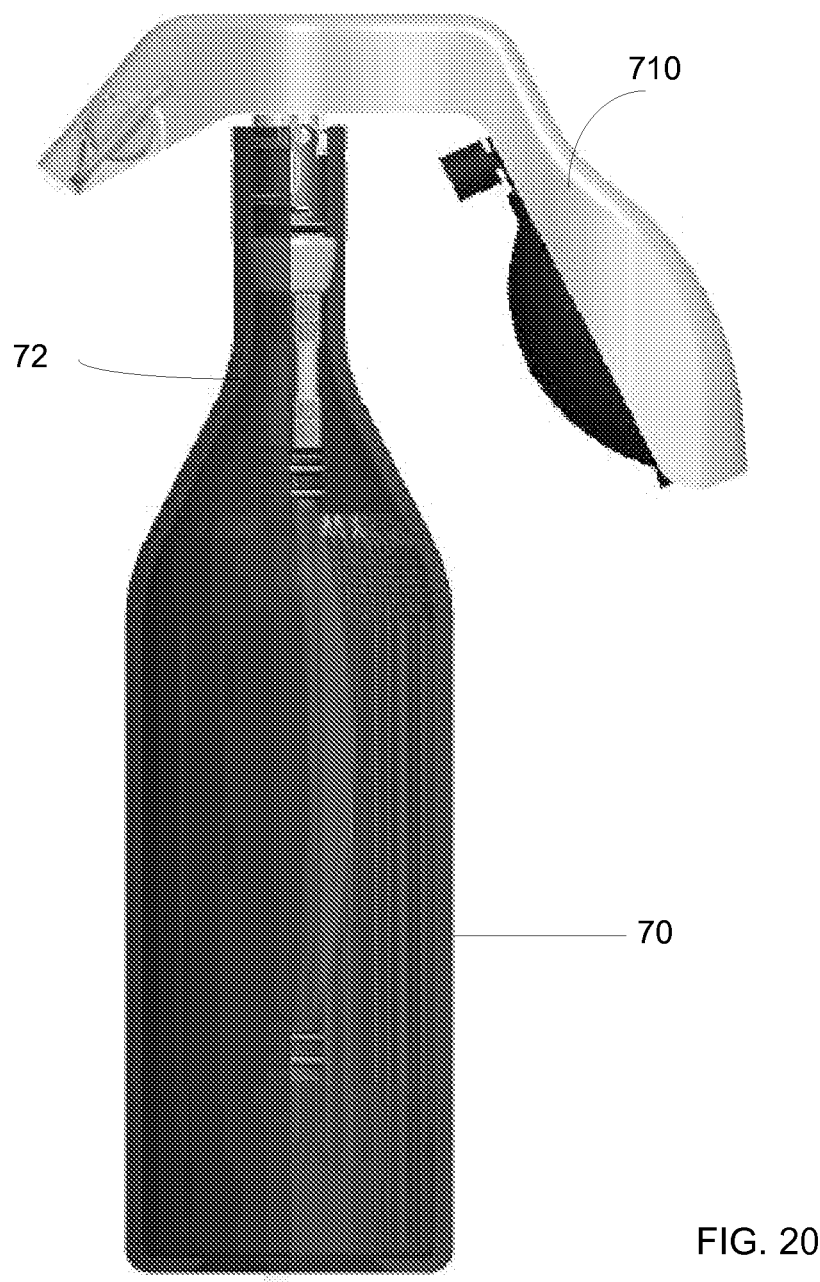
FIG. 20 is a side view of another embodiment of an air removal and wine dispenser device inserted into a bottle.

FIG. 20 is a side view of another embodiment of a air removal and wine dispenser device 700 inserted into a bottle 70.

Figure 21:
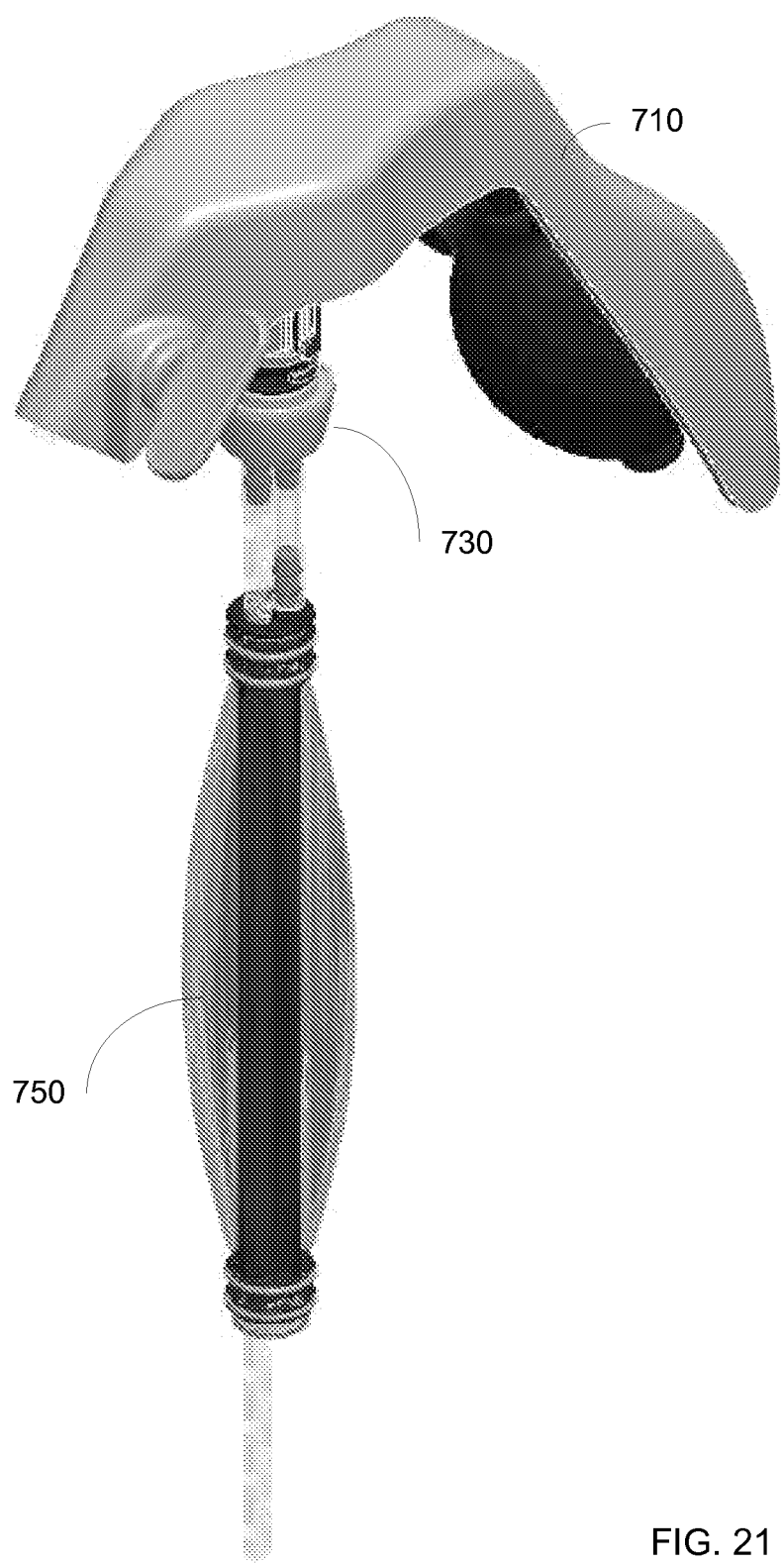
FIG. 21 is a side perspective view of the air removal and wine dispenser device of FIG. 20.

FIG. 21 is a side perspective view of the air removal and wine dispenser device 700 of FIG. 20. In this embodiment, the air removal and wine dispenser device device 700, includes a handle assembly 710, a stopper assembly 730, and a disposable balloon assembly 750.

Figure 22:
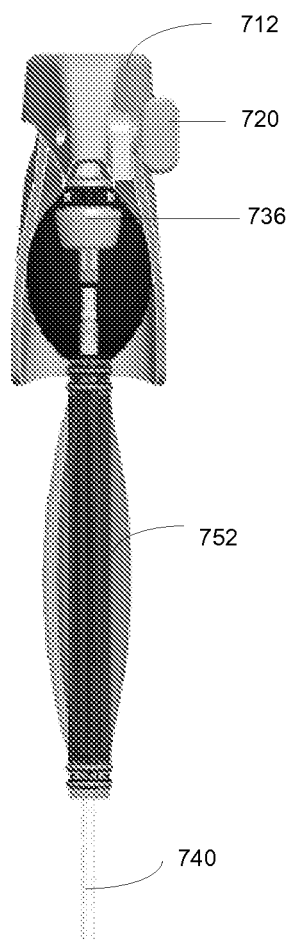
FIG. 22 is a cross section view of the air removal and wine dispenser device of FIG. 20.

FIG. 22 is a cross section view of the air removal and wine dispenser device 700 of FIG. 20 showing portions of handle 712, wine lock valve 720, seal 736, balloon 752, and lower wine tube 740.

Figure 23:
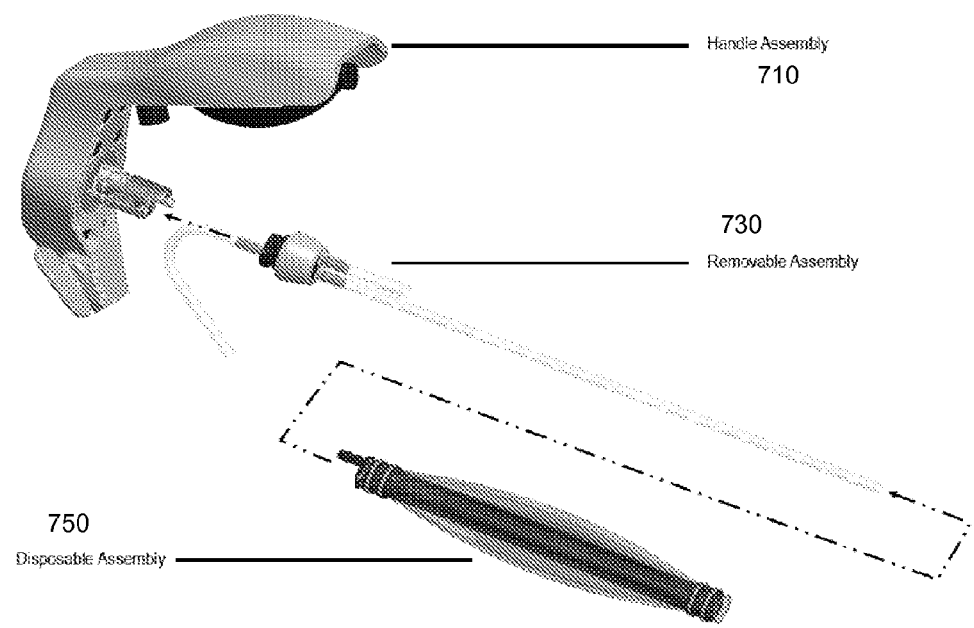
FIG. 23 is an exploded perspective view of the air removal and wine dispenser device of FIG. 20.
Figure 24:
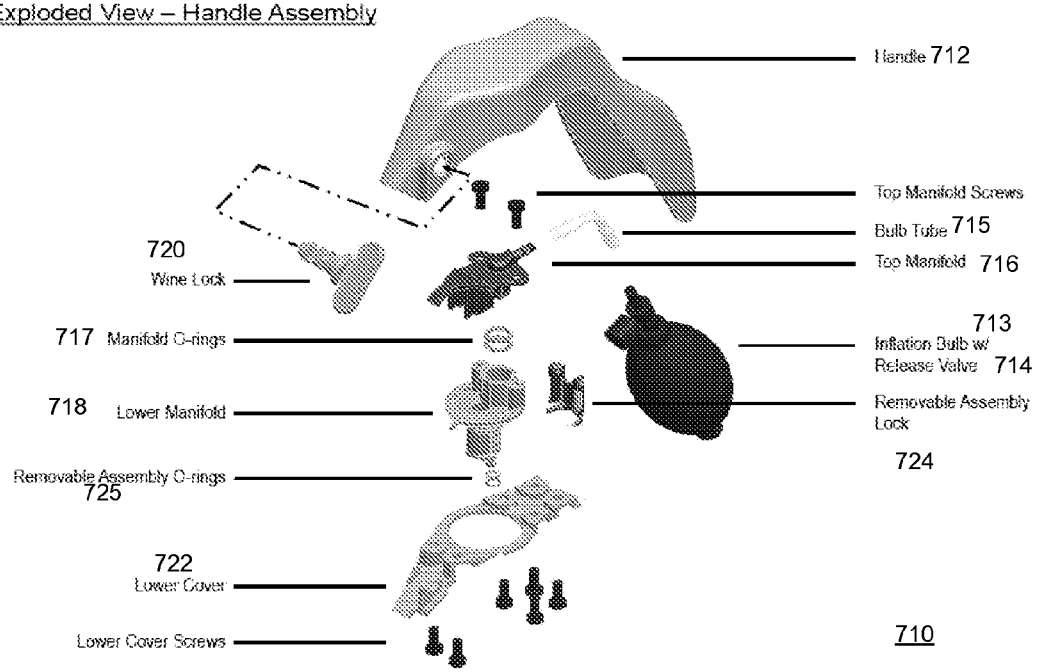
FIG. 24 is an exploded perspective view of the handle assembly of FIG. 20.
Figure 25:
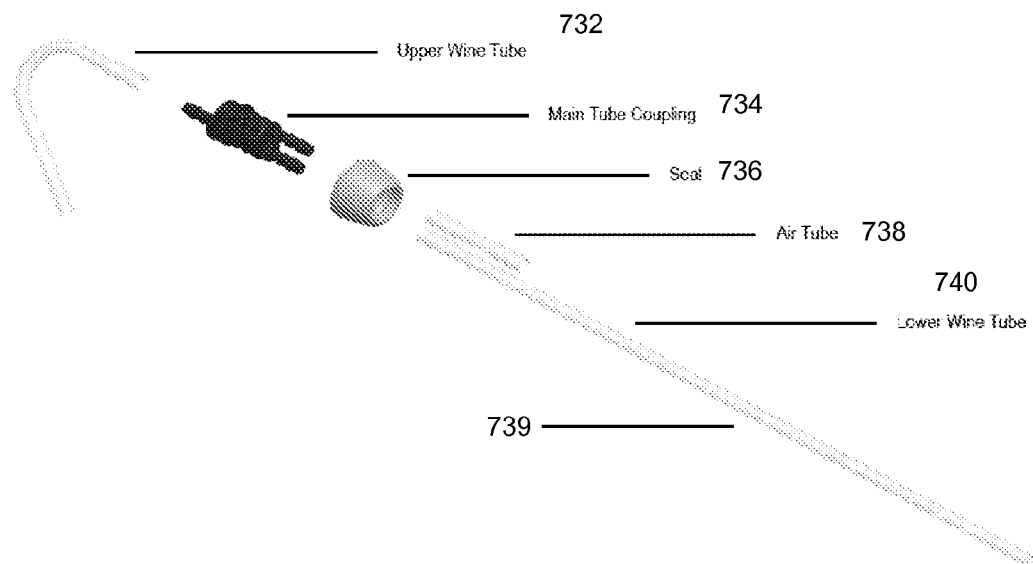
FIG. 25 is an exploded perspective view of the stopper assembly of FIG. 20.

FIG. 23 is an exploded perspective view of the air removal and wine dispenser device of FIG. 20. FIG. 24 is an exploded perspective view of the handle assembly 710 of FIG. 20. FIG. 25 is an exploded perspective view of the stopper assembly 730 of FIG. 20.

In this embodiment, the handle assembly 710 includes handle 712 and an inflation bulb 713 to inflate balloon 752 in the disposable balloon assembly, and release valve 714 which provides air through bulb tube 715, top manifold 716, and lower manifold 718 to the removable assembly main tube coupling 734 and air tube 738 to the balloon.

The handle assembly also includes manifold o-rings 717, a wine lock 720, a lower cover 722, and removable assembly lock 724.

Seal 736 on the stopper assembly fits against the bottle neck. The seal fits around main tube coupling 734. The main tube coupling provides a path for air through the top manifold and lower manifold and the air tube, so that air can inflate the balloon. The main tube coupling also provides a path for wine from the lower wine tube 740 and the upper wine tube 732. The lower portion of the lower wine tube 740 may also include perforations 739 to permit wine to be forced into the lower wine tube.

Figure 26:
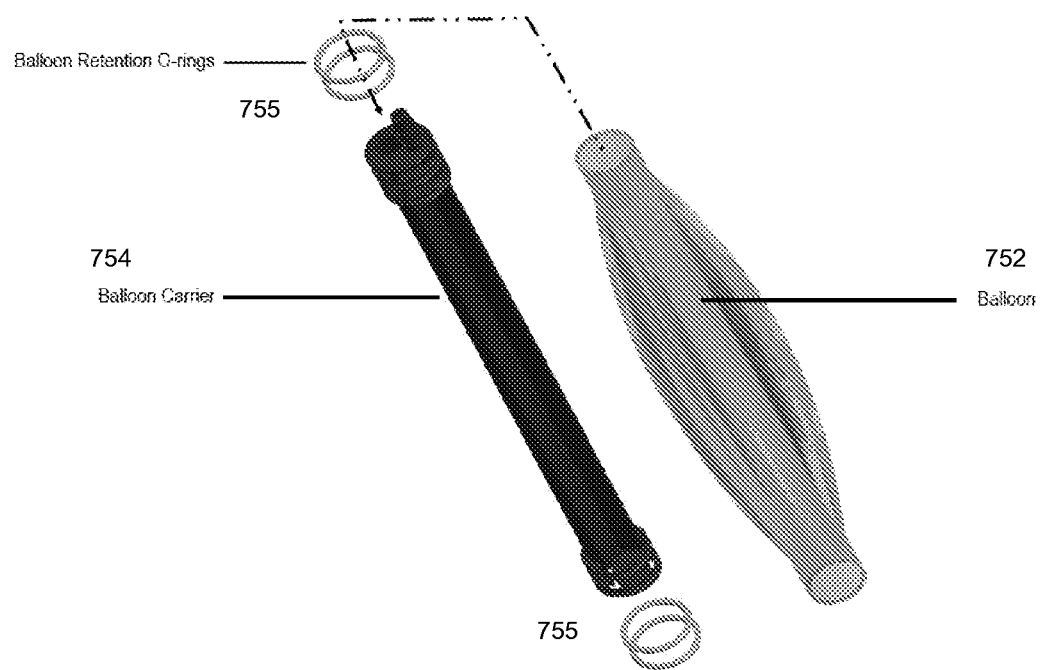
FIG. 26 is an exploded perspective view of the disposable balloon assembly of FIG. 20.

FIG. 26 is an exploded perspective view of the disposable balloon assembly 750 of FIG. 20.

In this embodiment, the balloon 752 is provided on a balloon carrier 754 balloon. The balloon is sealed by retention o-rings 756. The balloon carrier includes an air tube connector 755 which is inserted in air tube 738. The lower wine tube 740 is inserted through the balloon carrier so that wine is forced below the inflated balloon into the lower wine tube.

In one example, the balloon seals against the inside of the wine bottle. In another example, one or more gaps is provided to permit air below the inflating balloon to escape.

Example Operation

At step 2000, the stopper assembly 730 of the air removal and wine dispenser device 700 is inserted through the top of a wine bottle. Insertion of the device is typically performed after pouring one or more glasses of wine from the bottle.

At step 2100, the wine lock valve 720 is opened while the inflation bulb 713 is operated by squeezing and releasing the bulb.

At step 2200, continued pumping operation forces air into the balloon to inflate the ballon and to displace air through perforations in the lower wine tube.

At step 2400, the first wine is expelled out the upper wine tube 732. If desired, the wine lock valve may remain open while one or more glasses of wine is dispensed.

At step 2500, the wine lock valve is closed, and the wine bottle and is stored with the air removal and wine dispenser device.

At step 2600, the wine lock valve is closed opened to dispense one or more glasses of wine. The inflation bulb 713 may be operated during this dispensing in order to provide more wine pressure and wine flow. The storage and dispensing operations may be repeated.

At step 2700, the release valve 715 is opened which permits the balloon to be deflated through air tube 738.

At step 2800, the air removal and wine dispenser device is removed from the bottle.

At step 2900, the disposable assembly 750 is replaced, and the device is ready to be used on another bottle of wine.

Inflatable Displacement Bag Provided Inside Tube

Figure 2A:
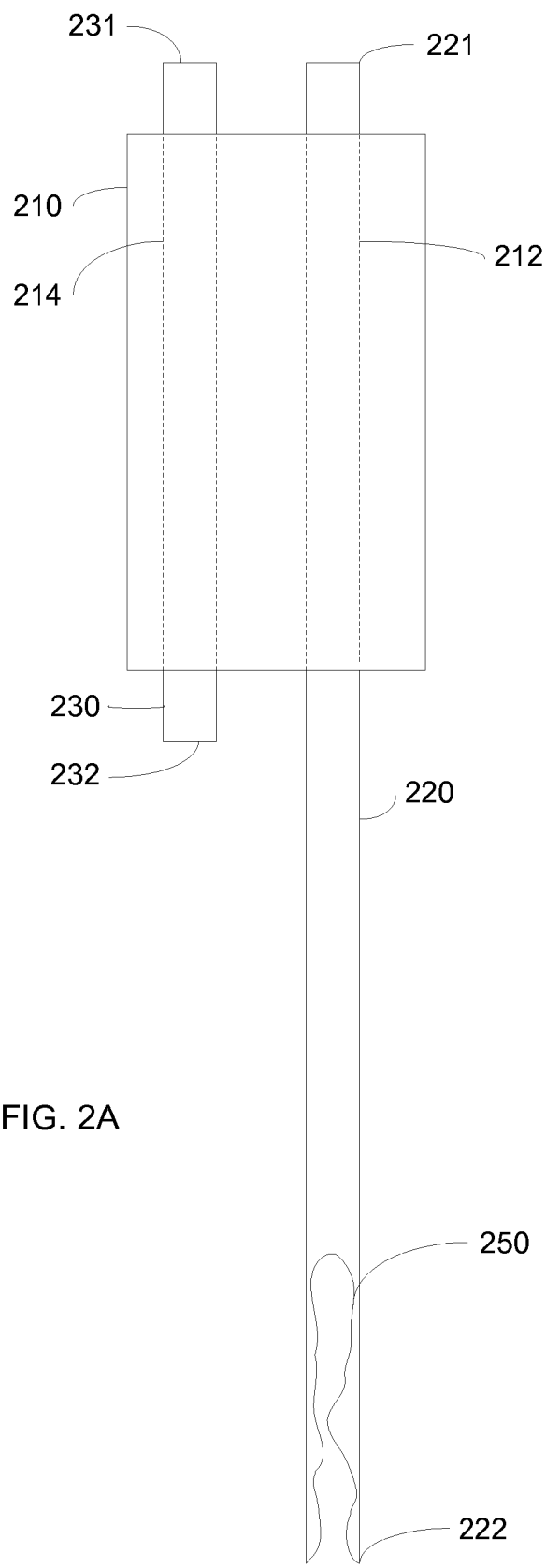
FIG. 2A is a side view of a cork and tube apparatus of a second embodiment of the invention.

FIG. 2A is a side view of a cork and tube apparatus of a second embodiment of the invention. In this embodiment, a stopper or cork 210 has a first hole 212 and a second hole 214. A first tube 220 having a first end 221 and a second end 222 is inserted into the first hole. A membrane 250 is attached to the first tube in proximity to the second end, so that as air is forced down the first tube, the membrane is pushed out of the tube and allowed to expand in the bottom portion of the wine bottle (not shown). As additional air is forced down the first tube, the membrane volume expands and pushes the wine liquid level to the cork.

Figure 2B:
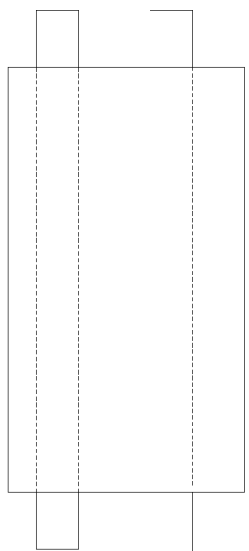
FIG. 2B is a side view of a partially inflated bag for the cork and tube apparatus of FIG. 2A.
Figure 2B:
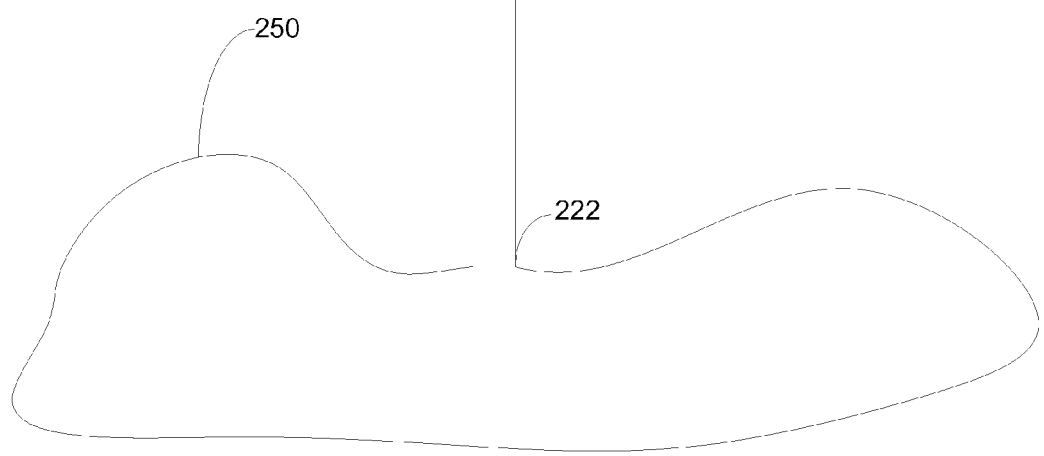

FIG. 2B is a side view of a partially inflated bag 250 for the cork and tube apparatus of FIG. 2A.

A second tube 230 is inserted into the second hole. The second tube includes a first end 231 and a second end 232. As the liquid level rises toward the cork, air is vented through the second tube. After the air is forced out the second tube may be closed or capped to prevent air from reentering the bottle.

This device is not limited to wines, and can be used on other liquids, such as carbonated beverages, juices, etc.

Inflatable Displacement Bag Provided on Outside of Tube

Figure 3:
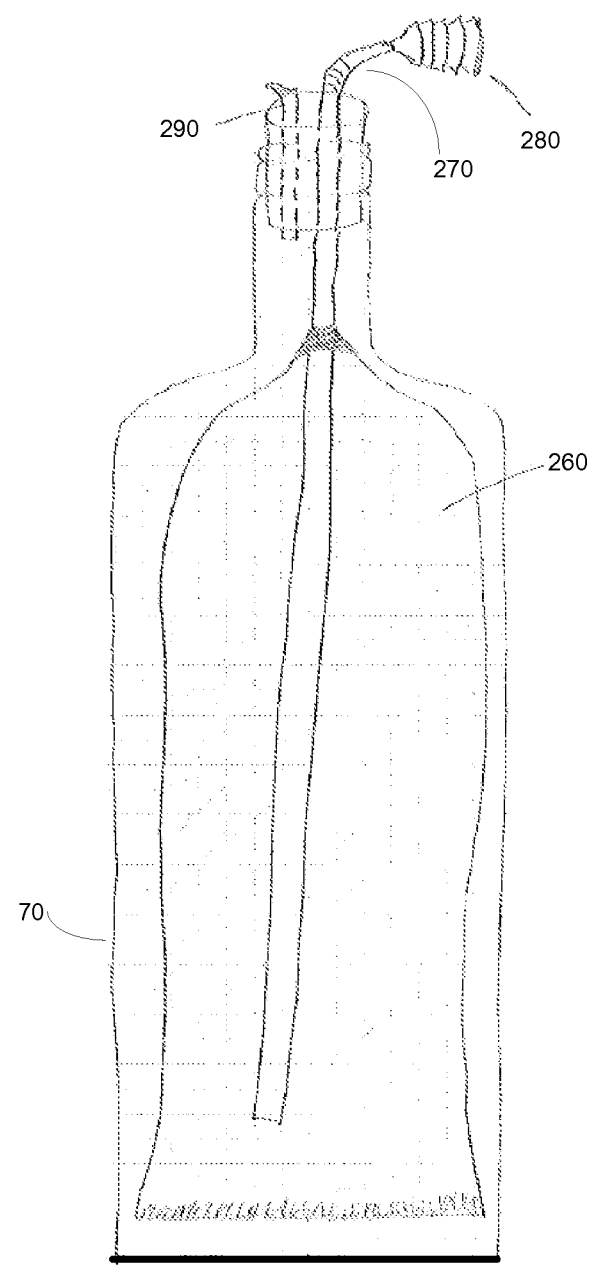
FIG. 3 is a side view of a wine bottle with a cork and third embodiment of the invention with an inflatable bag attached to the outside of a first tube.

FIG. 3 is a side view of a wine bottle 70 with a cork and third embodiment of the invention with an inflatable bag 260 attached to the outside of a first tube. A detachable pump 280 is provided to force air down the first tube into the inflatable bag. the tube seals when the pump is removed. A one way air valve 290 is provided at the top of the second tube to prevent air from reentering the bottle.

Figure 4:
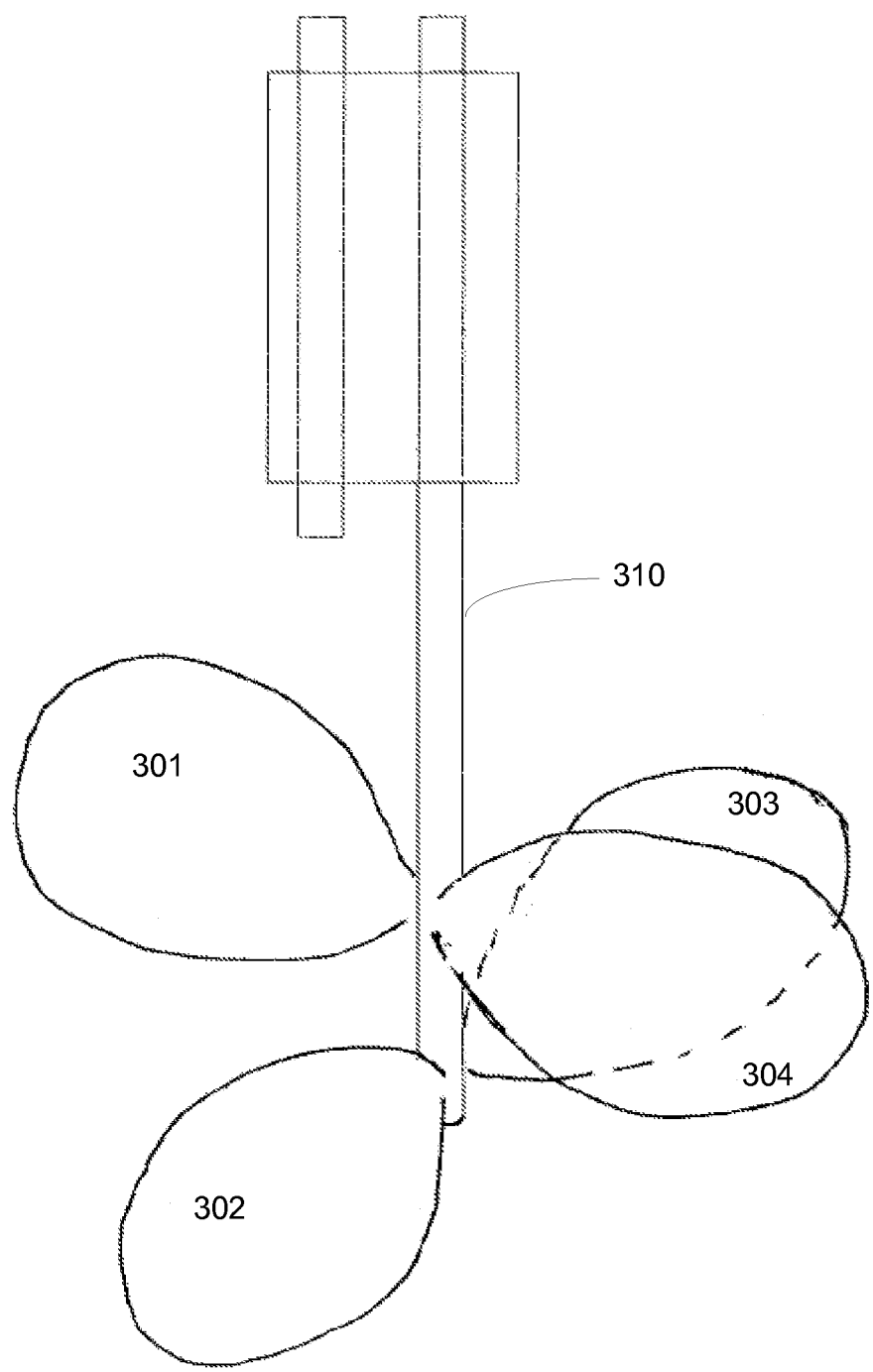
FIG. 4 is a side view of a cork and fourth embodiment of the invention with a plurality of inflatable bags attached to the outside of a first vent tube.

Inflatable Displacement Bag(s) Provided on Outside of Tube without Pressurization FIG. 4 is a side view of a cork and fourth embodiment of the invention with a plurality of inflatable bags 301, 302, 303, and 304 attached to the outside of a first vent tube 310.

In this embodiment, a non-pressurized system comprises a stopper 320 with the first vent tube 310 and a second pour tube 320 and. As wine is poured from the pour tube, air enters the vent tube and inflates the bags or balloons 301-304. In this embodiment, one or more bags or balloons may be provided. A cap, valve, or one way air valve may be provided at the top of the pour tube to prevent air from entering the wine bottle through the pour tube. The pour tube may protrude slightly below the stopper so that sediment is caught between the pour tube, stopper, and wine bottle as the bottle is emptied.

Chambered Stopper

Figure 5:
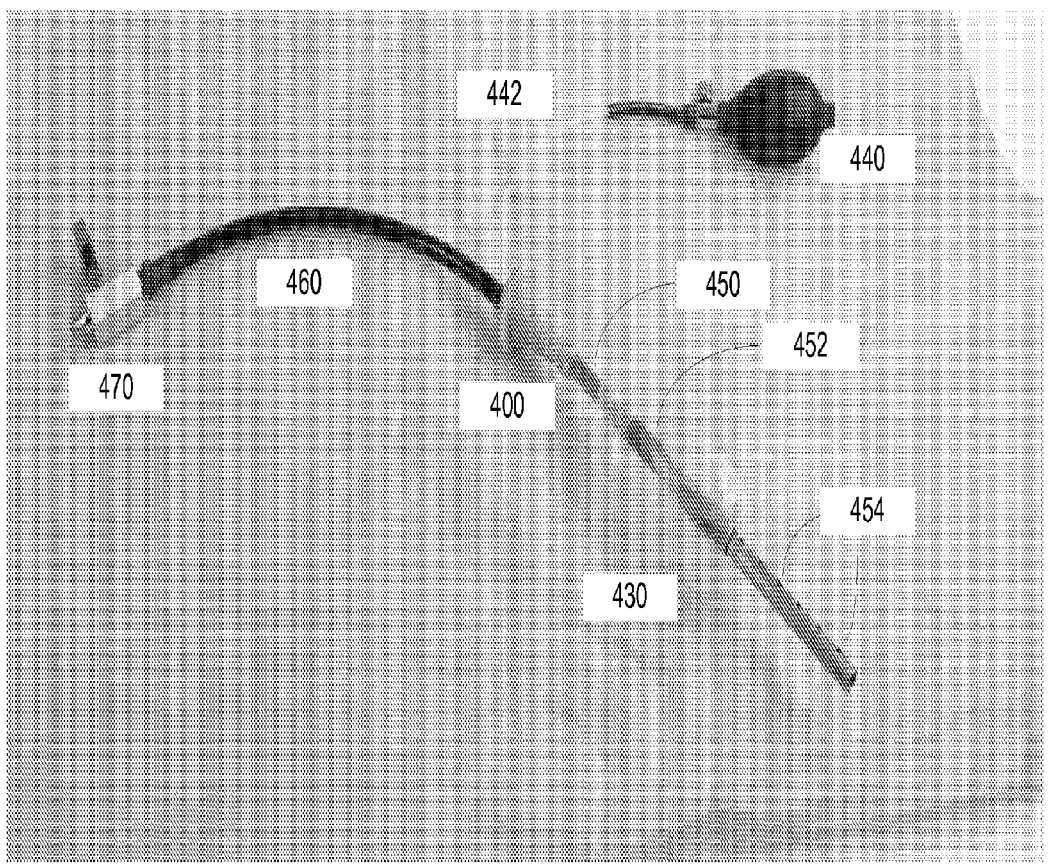
FIG. 5 is a top perspective view of a fifth embodiment of the invention with a chambered stopper having a first pressurization path to a balloon, and a second wine serving path.

FIG. 5 is a top perspective view of a fifth embodiment of the invention with a chambered stopper 400 having a first pressurization path to a balloon 430, and a second wine serving path. In this example, the balloon 430 is inflated with a bulb 440 which forces air through an inflation tube 442 to a portion of a twin tube 450 which has an inflation port 452. As the balloon is inflated, it forces air out perforations 454 in the twin tube and through a vent and serving tube 460 and valve 470. The valve is opened to let air escape and then closed to contain the liquid. In order to serve the liquid, the valve is opened. The balloon may be further inflated if necessary to provide pressure to force the liquid out of the vent and serving tube.

Figure 6:
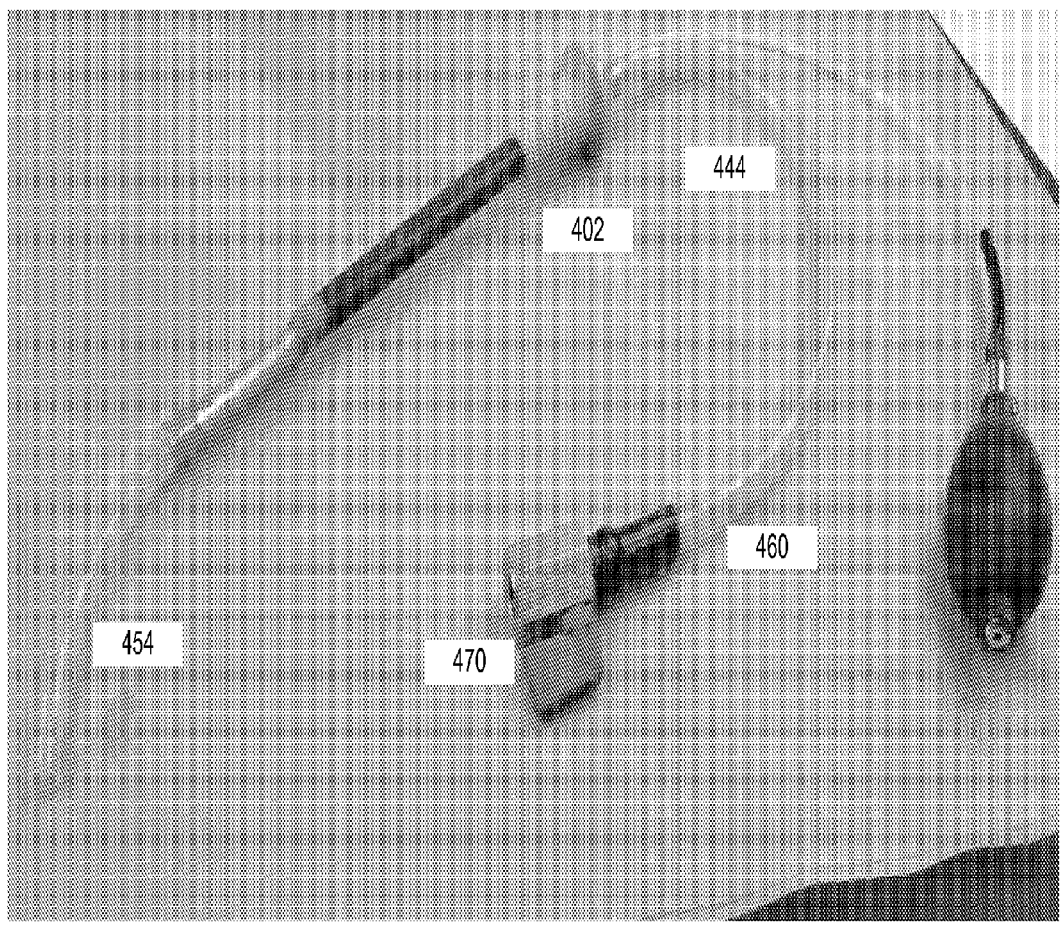
FIG. 6 is a top perspective view of a variation of the fifth embodiment of the invention with a flexible tube extension.

FIG. 6 is a top perspective view of a variation of the fifth embodiment of the invention with a flexible tube extension. In this example, the inflation tube 444 is separate from the serving tube and both tubes go through the stopper 402. A flexible and perforated tube 454 is provided at the bottom of the twin tube. The balloon is not shown in this figure.

Variations of these specific examples and embodiments will be apparent to those skilled in the art. The current invention applies generally to methods for displacing a gas from a liquid storage container.

Floating Lid Decanter

Figure 1A:
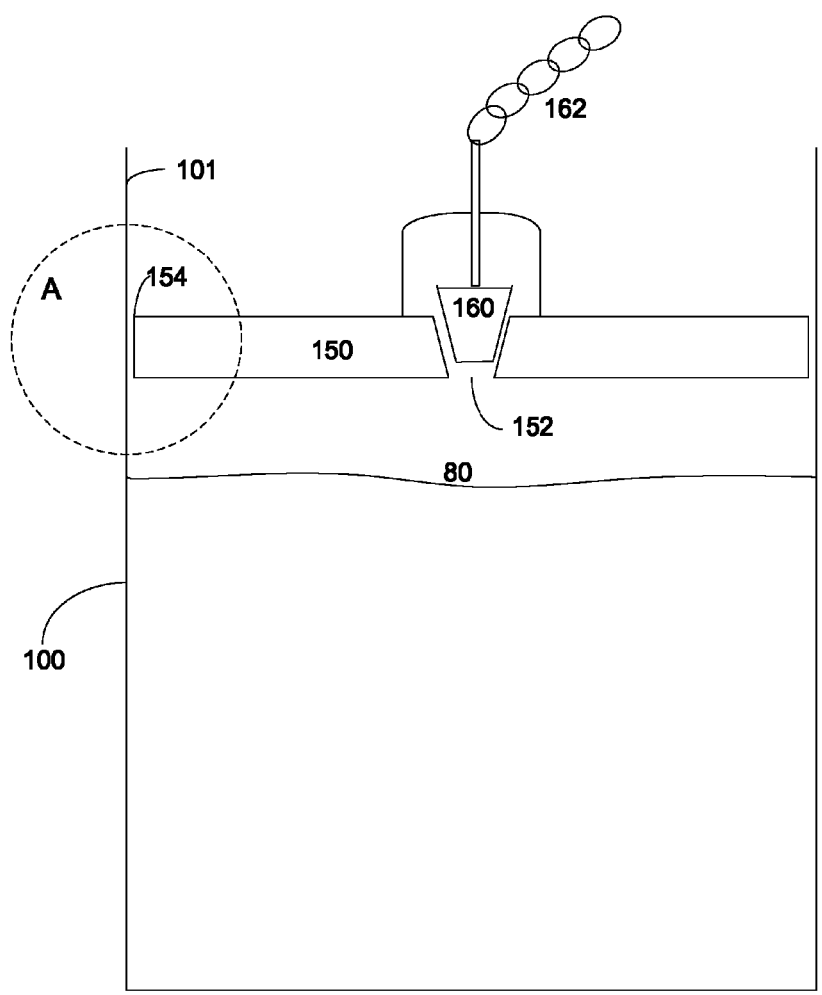
FIG. 1A is a side view of one embodiment of a wine decanter with a floating lid.

FIG. 1A is a side view of one embodiment of a wine decanter 100 with a floating lid 150. The decanter and lid are preferably made of glass, but may be constructed of other materials, or a combination of materials. The lid has a hole 152 which permits air to escape as the lid lowers toward the wine surface 80. After the air is removed, the stopper 160 may be placed in the hole. A chain 162 is provided to raise the stopper so that the lid can be raised.

Figure 1B:
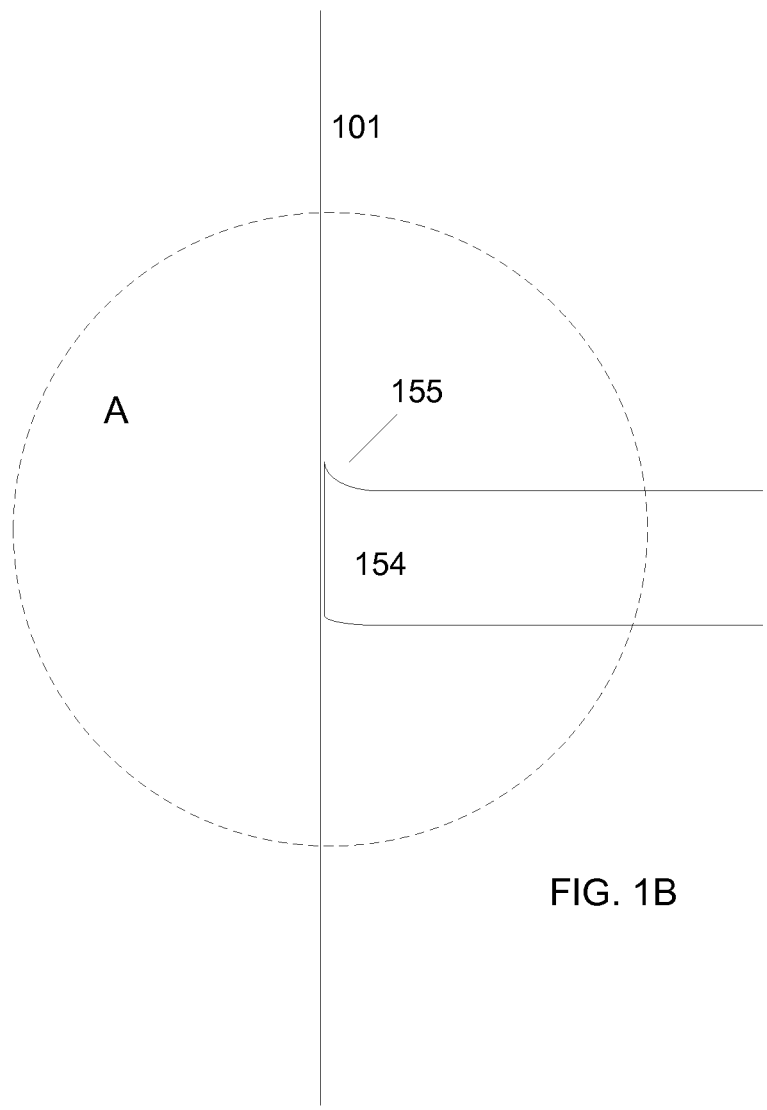
FIG. 1B is a detailed view of the side of the lid of the decanter on FIG. 1A.

FIG. 1B is a detailed view "A" of the side of the lid 154 of the decanter on FIG. 1A. The side may include a tapered edge 155 to provide a high tolerance fit of the lid against the side wall 101 of the decanter. The decanter may include a spout (not shown).

While an exemplary embodiments of the invention have been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. An air removal and wine dispenser device for a wine bottle having a bottom and a neck, the air removal and wine dispenser device comprising
   a bottle seal;
   a balloon inflation element;
   a disposable balloon assembly comprising
      a balloon, and
      a balloon inflation tube connecting the balloon inflation element and the balloon;
   a wine dispensing tube comprising
      a distal wine entry end, and
      a proximal wine dispensing end;
   a wine valve;
   a vent tube; and
   a vent manifold comprising
      a first inlet connected to the wine dispensing tube;
      a second inlet connected to the vent tube; and
      an outlet connected to the wine valve, so that the wine valve controls both air bleed from the bottle and wine flow.

2. The air removal and wine dispenser device of claim 1 wherein
   the bottle seal is a cam seal; and
   the cam seal is connected to a cam shaft and cam lever.

3. The air removal and wine dispenser device of claim 1 wherein
   the balloon inflation element is configured to fit over the neck of the wine bottle.

4. The air removal and wine dispenser device of claim 1 wherein
the wine dispensing tube is routed through the balloon.

5. The air removal and wine dispenser device of claim 4 wherein
the balloon is elongated.

6. The air removal and wine dispenser device of claim 4 wherein
the balloon is positioned along a middle portion of the wine dispensing tube.

7. The air removal and wine dispenser device of claim 1 further comprising
an elevation element provided on the distal end of the wine dispensing tube.

8. The air removal device and wine dispenser device of claim 1 further comprising
a deflation air valve.

9. A method of removing air and dispensing wine from a wine bottle, the method comprising
providing an air removal and wine dispenser device comprising
a bottle seal,
a balloon inflation element,
a disposable balloon assembly comprising
a balloon, and
a balloon inflation tube connecting the balloon inflation element and the balloon,
a wine dispensing tube comprising
a distal wine entry end, and
a proximal wine dispensing end,
a wine valve, and
a vent tube, and
a vent manifold comprising
a first inlet connected to the wine dispensing tube;
a second inlet connected to the vent tube; and
an outlet connected to the wine valve, so that the wine valve controls both air bleed from the bottle and wine flow;
inserting the air removal and wine dispenser device;
sealing the air removal and wine dispenser device relative to the wine bottle;
partially inflating the balloon;
venting air from the wine bottle; and
dispensing wine from the wine bottle.

10. The method of claim 9 wherein inserting the air removal and wine dispenser device further comprises
positioning the balloon so that wine is present below the balloon, and both wine and air are present above the balloon.

11. The method of claim 10 wherein venting air from the wine bottle further comprises connecting the wine dispensing tube to the air vent tube upstream of the wine valve so that the wine valve controls both air bleed from the bottle and wine flow.

12. The method of claim 9 wherein sealing the air removal and wine dispenser device relative to the wine bottle further comprises providing a cam seal assembly comprising a cam lever, a cam shaft, and a cam seal; and
expanding the cam seal by lowering the cam lever.

13. The method of claim 9 further comprising
providing an inflation pump outside of the wine bottle neck; and
using the inflation pump to inflate the balloon.

14. The method of claim 9 further comprising
deflating the balloon;
removing the air removal and wine dispenser device from the wine bottle; and
attaching a new disposable balloon assembly to the air removal and wine dispenser device.

15. The method of claim 14 wherein deflating the balloon further comprises opening a deflation air valve by raising the cam lever.

\* \* \* \* \*